United States Patent [19]

Sturgeon

[11] 3,743,998
[45] July 3, 1973

[54] ELECTRIC BRAKE CONTROLLER
[75] Inventor: Edward G. Sturgeon, Orchard Lake, Mich.
[73] Assignee: Syncro Corporation, Oxford, Mich.
[22] Filed: Apr. 10, 1972
[21] Appl. No.: 242,856

Related U.S. Application Data
[63] Continuation of Ser. No. 158,388, June 30, 1971, abandoned.

[52] U.S. Cl.................................. 338/96, 338/153
[51] Int. Cl............................................. H01c 5/04
[58] Field of Search...................... 338/96, 92, 153, 338/155

[56] References Cited
UNITED STATES PATENTS
3,304,531  2/1967  McInnis............................... 338/96
3,328,739  6/1967  McInnis et al...................... 338/96
3,524,159  8/1970  Kilbourn........................... 338/96 X Primary Examiner—Harold Broome
Assistant Examiner—D. A. Tone
Attorney—William L. Anthony, Jr.

[57] ABSTRACT

A brake controller for an electric brake which can be operated either manually or by hydraulic fluid from an associated hydraulically operated brake system and in which improved modulation of the electric brake applying current and economies and improvements in assembly and adjustment are achieved.

16 Claims, 2 Drawing Figures

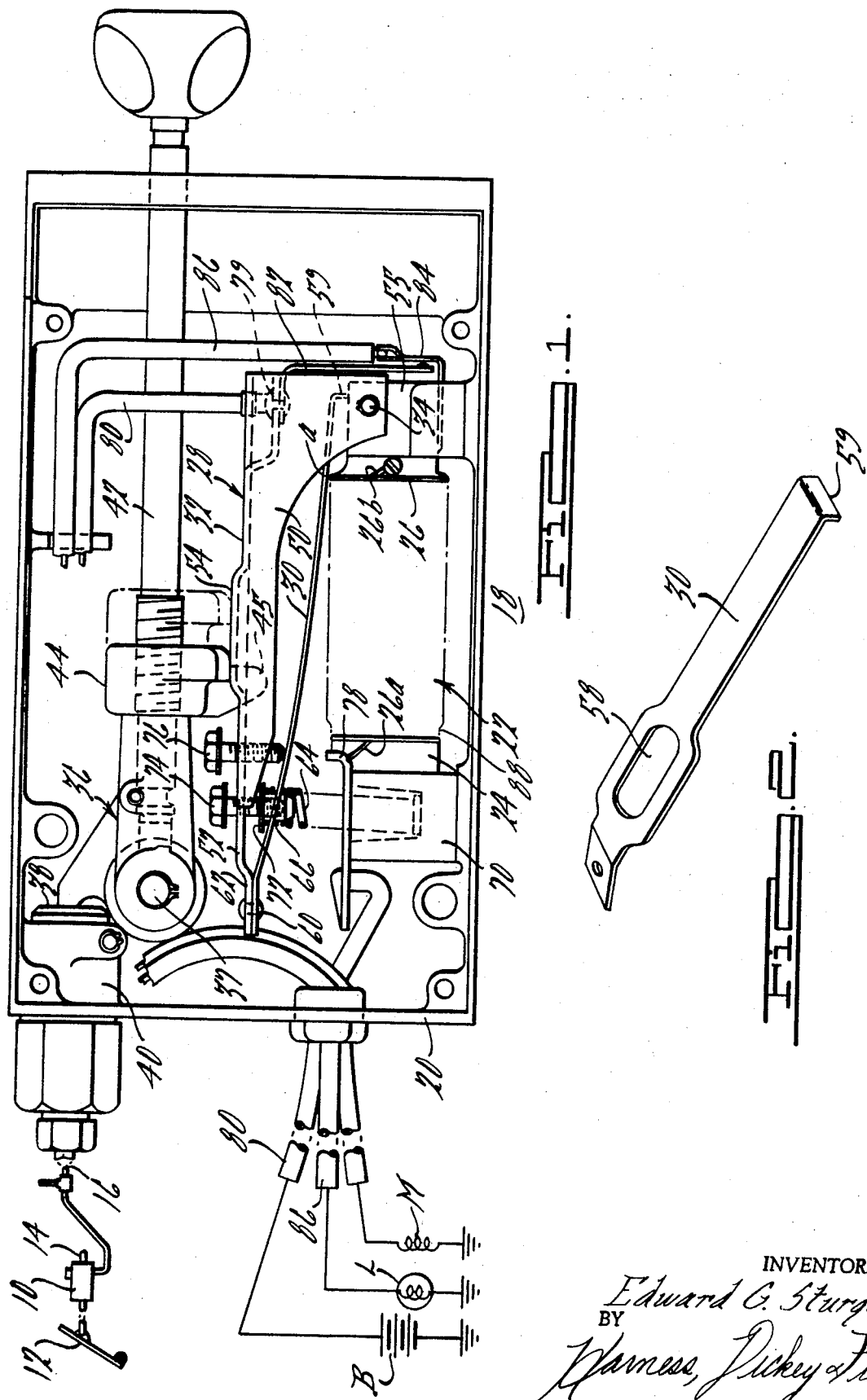

ELECTRIC BRAKE CONTROLLER

This is a continuation of application Ser. No. 158,388, filed June 30, 1971 now abandoned.

SUMMARY OF THE INVENTION

Though not limited thereto, this invention is particularly well adapted for use in controlling electrically actuated brakes for vehicle trailers or the like, in which application the brake controller is mounted upon the towing vehicle and may be actuated to apply the trailer brakes, either manually or hydraulically in response to the application of the brakes of the towing vehicle.

In these brake controller systems the brake controller constitutes a rheostat the electrical resistance whereof, and consequently the current supplied to the brake magnet or magnets on the trailer, can be progressively varied or modulated over a wide range to correspondingly vary the excitation of a brake magnet or magnets and thereby vary the degree of brake application between released and fully applied conditions.

Smooth changes in degree of brake application require correspondingly smooth modulation of the rheostat resistance. It has been found that this smooth modulation can best be achieved with controllers comprising an axially extending helical coil of resistance wire and a flexible conductor which can be progressively flexed into or away from shunting relation to successive turns of the wire.

Commercially successful controllers of the last mentioned type are shown in McGinis et al., U.S. Pat. No. 3,328,739, granted Jan. 27, 1967, and in application, Ser. No. 15,773, filed Mar. 2, 1970, by the present applicant, both of which are assigned to the assignee of the present application. The present improvements are directed primarily to refinements of the structures of said patent and pending application and, in particular, provide for smooth modulation and greater ease of assembly and adjustment.

Therefore, principal objects of the present invention are to provide an improved electric brake controller characterized as incorporating an improved relationship between a flexible current varying rheostatic element and a manual or hydraulic actuated brake control member whereby to achieve smoother and more uniform modulation of the brake applying current; and to provide such structures incorporating dual adjusting elements whereby assembly and adjustment are simplified and improved.

Other objects and advantages of the present invention will become apparent from the following description and claims of and respecting the preferred but illustrative embodiment shown in the accompanying drawings in which:

FIG. 1 is a view in front elevation, with the cover removed, of a brake controller embodying the invention; and FIG. 2 is a view in perspective of the contact strip of the controller.

Referring now to the drawing, a conventional master cylinder 10 is under control of a food pedal 12 and feeds at least one brake line 14 for the main brakes of a towing vehicle. A fluid line 16 extends from the master cylinder 10 to the improved electric brake controller 18 of the present invention.

Stated generally, the controller 18 includes a housing 20 in which is fixedly supported a resistor assembly 22, which in turn includes a cylindrical core 24 on which is wound a plurality of turns of resistance wire 26. The housing also accommodates a contactor assembly 28 comprising a resilient or spring contact member 30 secured to a supporting arm 32 for selective engagement with the turns of the wire 26. The arm 32 is pivotally connected to the resistor assembly 22 by pin 34.

In accordance with the arrangement described in more detail in said copending application, Ser. No. 15773, pivotal movement of arm 32 between the illustrated brake released position and the fully applied position is effected by means of an operating lever 36 which is pivotally supported within the housing 20 upon pin 37. Lever 36 is of bell crank form and one arm thereof projects upwardly and is engaged by the piston 38 associated with cylinder 40 which is fed from the aforesaid brake cylinder 10. The other arm of lever 36 rotatably receives the end of rod 42 having a threaded intermediate section which threadably carries an operating cam 44. Cam 44 has a downwardly depending portion which abuts arm 32 and provides an operating connection therebetween. Rotation of rod 42 causes cam 44 to travel axially thereof and varies the relative effective lengths of the two arms of the bell crank lever 36 and thereby varies the amount of vertical movement imparted to cam 44 per unit of movement of piston 38. The position of cam 44 along arm 28 also governs the degree of pivotal movement of the latter that is produced per unit of vertical movement of cam 44. The described assembly therefore provides a simple and effective means of adjustably controlling the relation between movement of lever 36 and of arm 32.

Preferably and as shown, rod 42 projects outwardly of the housing 20 through a vertically elongated slot in the end thereof and carries an operating knob by means of which the rod can be rotated to effect the aforesaid adjustment or may be swung up and down to manually set or release the trailer brakes.

Considering the contactor assembly in more detail, arm 32 is of generally downwardly presented U-shaped form having laterally spaced legs 50 and an innerconnecting web portion 52. Intermediate its length, the web 52 is provided with a slightly elevated seat portion 54 which is engaged by the previously mentioned operating cam 44. Seat 54 is slotted to receive a projection 45 on cam 44 and prevent rotation of cam 44 in response to rotation of control rod 42. The legs 50 of the arm 32 straddle the abutment like portion 55 provided at the right-hand end of the core 24 of the resistor assembly. Abutment portion 55 also provides a journal for the previously mentioned pin 34 by means of which the contactor assembly 28 is pivotally connected to the resistor assembly.

As clearly appears in FIG. 2, the spring contact strip 30 has a planar elongated body portion which is widened near the left-hand end thereof, as seen in the drawing, so as to accommodate an elongated aperture 58. The extreme left-hand end of contact strip 30 is slightly bent and is rigidly secured as by a rivet 60 to a tongue 62 which projects from the previously mentioned U-shaped body portion of the arm 32. The right-hand end portion 59 of contact strip 30 is downwardly turned and rests upon the top surface of the previously mentioned core portion 55, and, as described below, determines the starting gap between the contact strip 30 and the resistance wire 26.

The contact assembly 28 is continuously biased to the illustrated brake released position by means of a dual spring assembly, which extends with ample clearance through slot 58 in spring contact strip 30, and comprises a primary spring 64, secondary spring 66, locator 72 and adjusting screw 74. Primary spring 64 is seated in a recess in the end portion 70 of the core 24. The secondary spring 66 has relatively few turns and is seated between the upper end of the primary spring 64 and the flange of locator 72. Locator 72 has an upwardly opening recess which receives screw 74 which in turn is threaded through the web 52 of the arm 32.

Springs 64 and 66 continuously bias the contact assembly to the illustrated brake released position. In this position the primary spring 64, which has a considerably higher rate than the secondary spring 66, is almost fully extended, and consequently the force required to initiate a counterclockwise or brake applying movement of the contact assembly 28 is determined primarily by spring 66. The initial tension of springs 64 and 68 can be governed by adjusting screw 74.

An adjustable limit to the counterclockwise or brake applying movement of the contact assembly 28 is provided by an additional adjusting screw 76 which is also threaded through the web 52 of arm 32, and the lower end whereof also projects through the opening 58 in contact strip 30, with ample clearance. Counterclockwise or brake applying movement of the contact assembly 28 ultimately brings the lower end of adjusting screw 76 into engagement with the upwardly turned end portion of a terminal 78 which is fixedly secured to the core portion 70.

Preferably and as illustrated, in the brake-released position, contact strip 30 is slightly flexed and the turned end 59 therefore bears upon abutment portion 55 with a preselected force determined by the spring rate of strip 30. The reaction of strip 30 to this abutting force urges the arm 32 in a clockwise direction, and thus supplements the forces exerted by the springs 64 and 66.

It will also be seen that in the brake released position, the turned end 59 maintains strip 30 out of contact with resistance wire 26 and establishes the initial gap in the brake circuit.

Before describing a brake applying or releasing action of the present structure, it is noted that the left-hand end 26a of wire 26 is electrically connected to terminal 78, which in turn is connected to the associated brake magnet or magnets M. The right-hand end 26b of wire 26 is fixed to the core 24 but has no other external circuit connection except in series through contact strip 30 and arm 32 which is electrically connected at 79 to the battery lead wire 80. Arm 32 also carries a stop light terminal 82, which in the brake released condition is spaced from a mating terminal 84, which in turn is connected to a stop light L through wire 86.

Considering now a braking applying operation, rocking of bell crank lever 36, either as hydraulically influenced by piston 38 or manually by control rod 42, correspondingly rocks arm 32, this initial motion being primarily resisted by secondary spring 66 and the small stress in contact strip 30. This movement of arm 32 brings area a of contact strip 30 into engagement with the right-hand end or first working, turn of wire 26 and thereby establishes the initial circuit for the electric brake extending from the battery B, through arm 32, strip 30, all of the turns of wire 26, and thence through terminal 78 to the brake magnet M. This engagement preferably occurs just after secondary spring 66 reaches its fully collapsed condition and is also resisted by the force of the primary spring 64. Concurrently with completion of the brake circuit, terminal 82 engages the stoplight terminal 84 and completes the stop light circuit. Continued counterclockwise motion of arm 32 lifts the end 59 away from abutment 55 and causes the body of the strip 30 to progressively engage, and shunt from the brake circuit, the successive turns of wire 26, including the last working turn thereof. In the fully applied position, strip 30 engages stop 78 and this engagement completely short-circuits all of wire 26. Preferably and in accordance with the invention described and claimed in said U.S. Pat. No. 3,328,739, a final length 88 of wire 26, beyond the last working turn, is electrically isolated from strip 30 (as by reducing the diameter of the core 24 at the left-hand end thereof). The isolated turn or turns 88 remain in circuit until strip 30 engages stop 78, and so provide current limiting or burn-out protection for winding 26.

It is important in these electric brake controllers that the unit pressures, in cylinder 40, at which successive working turns of winding 26 are engaged, and at which the entire winding 26 is shunted, be accurately controlled and readily adjustable. This is facilitated in the present structure by providing the dual screws 74 and 76, and the adjustable cam 44.

As will be obvious the unit hydraulic pressure in cylinder 40 at which the initial and final working turns of winding 26 are engaged can be readily controlled by adjustment of the position of cam 44 along rod 42 and by adjusting screw 74 which determines the degree of preloading of springs 64 and 66.

It is also important that the limit stop be reached at a unit hydraulic pressure substantially equal to, but not less than, the pressure at which the final working turn of winding 26 is engaged. This is readily accomplished by means of the second adjusting screw 76, as will be understood, which can be turned to a position just short of engagement with terminal 78 when strip 30 engages the final working turn of winding 26.

It will be observed that the modulating action is very smooth, since strip 30 is secured at its left-hand end to portion 60 of arm 32 which has a very definite path of movement. Strip 30 thus "fulcrums" in a sense about the point of engagement of area a with the right-hand turn of wire 26 and progressively straightens out and engages the successive turns of the winding 26 as the downward motion of the left-hand end thereof continues. In some cases, in fully applied position, the strip 30 lies flat upon winding 26 and engages all working turns thereof. In other cases, the free end of strip 30 may tend to rise away from winding 26 as the brake is applied, and then re-engage winding 26 as the brake is released. Equally smooth modulation occurs during brake releasing movement of assembly 28. It has been found in practice that the progressive engagement and disengagement between strip 30 and winding 26 can reliably be made to occur one turn at a time.

Although only a single embodiment of the invention has been described in detail, it will be understood that the invention is susceptible of modification and change without departing from the scope of the claims.

What is claimed is:

1. An electric brake controller for electrically actuated brakes comprising a control winding having a plurality of helically disposed axially spaced turns, a contact assembly for progressively shunting successive turns of said control winding to thereby vary a brake applying control current, said assembly comprising an arm extending along said winding, said arm being pivoted adjacent one end thereof for movement about an axis substantially fixed with reference to said control winding, a spring contact strip disposed between said arm and said winding; means fixedly securing one end of said strip to said arm adjacent the other end of said arm, means providing an abutment to freely support the other end of said strip, spring means continuously urging said arm and spring strip to a position in which said strip is spaced from said winding and said one end thereof rests upon said abutment, and means for rocking said arm and strip so as to progressively bring a portion of said strip into electrical contact with said winding adjacent one end thereof and thereafter cause said strip to progressively engage and thereby shunt successive turns of said winding.

2. The structure of claim 1 including adjustable means providing a limit to said rocking movement of said arm.

3. The structure of claim 2 in which said adjustable means includes an element carried by and electrically connected to said arm engageable with a terminal of said winding to thereby shunt said winding.

4. The structure of claim 3 including an additional adjusting means for varying the tension of said spring means.

5. An electric brake controller for electrically actuated brakes comprising a control winding having a plurality of helically disposed axially spaced turns, a contact assembly for progressively shunting successive turns of said control winding to thereby vary a brake applying control current, said assembly comprising an arm extending along said winding, said arm being pivoted adjacent one end thereof, a spring contact strip disposed between said arm and said winding; means connecting said strip to said arm so that pivotal movement of said arm causes said strip to progressively and successively shunt turns of said winding; spring means continuously urging said arm and spring strip to a position in which said strip is spaced from said winding, a first adjusting means for varying the tension of said spring means, means for limiting said pivotal movement of said arm, and an additional adjusting means for adjustably determining said limit.

6. The structure of claim 5 including operating means connected to said arm for effecting said pivotal movement of said arm.

7. The structure of claim 6 including means for adjusting the connection between said operating means and said arm.

8. The structure of claim 7 in which said additional adjusting means includes an adjustable element carried by and electrically connected to said arm which at said limit engages a terminal of and shunts said winding.

9. An electric brake controller for electrically actuated brakes comprising a control resistor structure having a plurality of axially spaced portions, a contact assembly for progressively shunting successive ones of said portions of said control resistor structure to thereby vary a brake applying control current, said assembly comprising an arm extending along said control resistor structure, said arm being pivoted adjacent one end thereof for movement about an axis substantially fixed with reference to said control resistor structure, a spring contact strip disposed between said arm and said resistor structure; means fixedly securing one end of said strip to said arm adjacent the other end of said arm, means providing an abutment to freely support the other end of said strip, spring means continuously urging said arm and spring strip to a position in which said strip is spaced from said control resistor structure and said one end thereof rests upon said abutment, and means for rocking said arm and strip so as to progressively bring a portion of said strip into electrical contact with said control resistor structure adjacent one end thereof and thereafter cause said strip to progressively engage and thereby shunt successive ones of said portions of said control resistor structure.

10. The structure of claim 9 including adjustable means providing a limit to said rocking movement of said arm.

11. The structure of claim 10 in which said adjustable means includes an element carried by and electrically connected to said arm engageable with a terminal of said control resistor structure to thereby shunt said control resistor structure.

12. The structure of claim 11 including an additional adjusting means for varying the tension of said spring means.

13. An electric brake controller for electrically actuated brakes comprising a control resistor structure having a plurality of axially spaced portions, a contact assembly for progressively shunting successive ones of said portions of said control resistor structure to thereby vary a brake applying control current, said assembly comprising an arm extending along said control resistor structure, said arm being pivoted adjacent one end thereof, a spring contact strip disposed between said arm and said control resistor structure; means connecting said strip to said arm so that pivotal movement of said arm causes said strip to progressively and successively shunt said portions of said control resistor structure; spring means continuously urging said arm and spring strip to a position in which said strip is spaced from said control resistor structure, a first adjusting means for varying the tension of said spring means, means for limiting said pivotal movement of said arm, and an additional adjusting means for adjustably determining said limit.

14. The structure of claim 13 including operating means connected to said arm for effecting said pivotal movement of said arm.

15. The structure of claim 14 including means for adjusting the connection between said operating means and said arm.

16. The structure of claim 15 in which said additional adjusting means includes an adjustable element carried by and electrically connected to said arm which at said limit engages a terminal of and shunts said control resistor structure.

* * * * *